(12) United States Patent
Nestler et al.

(10) Patent No.: US 7,307,132 B2
(45) Date of Patent: Dec. 11, 2007

(54) METHOD FOR PRODUCING LOW-ODOR HYDROGEL-FORMING POLYMERS

(75) Inventors: Gerhard Nestler, Vienna (AT); Klaus Joachim Mueller-Engel, Stutensee (DE); Stefan Wickel, Bissersheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/511,603

(22) PCT Filed: May 12, 2003

(86) PCT No.: PCT/EP03/04945

§ 371 (c)(1),
(2), (4) Date: Nov. 3, 2004

(87) PCT Pub. No.: WO03/095510

PCT Pub. Date: Nov. 20, 2003

(65) Prior Publication Data

US 2005/0209411 A1  Sep. 22, 2005

(30) Foreign Application Priority Data

May 13, 2002  (DE) .............................. 102 21 176

(51) Int. Cl.
*C08F 20/06* (2006.01)
*C08F 120/06* (2006.01)
*C08F 220/06* (2006.01)

(52) U.S. Cl. .................. 526/317.1; 526/348; 562/600; 528/502 R; 528/502 F; 528/503

(58) Field of Classification Search ............ 526/317.1, 526/348; 562/600; 528/502 R, 502 F, 503
See application file for complete search history.

(56) References Cited

U.S. PATENT DOCUMENTS

| 4,306,955 | A | | 12/1981 | Neel et al. |
| 4,742,114 | A | | 5/1988 | Wetegrove et al. |
| 5,504,247 | A | * | 4/1996 | Saxer et al. ................ 562/600 |
| 5,817,865 | A | | 10/1998 | Machhammer et al. |
| 6,388,000 | B1 | * | 5/2002 | Irie et al. .................... 524/556 |
| 6,596,901 | B1 | | 7/2003 | Eck et al. |
| 6,710,141 | B1 | | 3/2004 | Heide et al. |
| 2004/0186229 | A1 | | 9/2004 | Heide et al. |

FOREIGN PATENT DOCUMENTS

| DE | 100 03 497 | 4/2001 |
| EP | 0 372 706 | 6/1990 |
| EP | 0 574 260 | 12/1993 |
| EP | 0 616 998 | 9/1994 |
| EP | 0 648 520 | 4/1995 |
| EP | 0 730 893 | 9/1996 |
| EP | 0 776 875 | 6/1997 |
| EP | 0 942 014 | 9/1999 |
| JP | 62-260906 | 11/1987 |
| JP | 5-40649 | 2/1993 |
| JP | 09-227445 | 9/1997 |
| JP | 08-034757 | 2/1998 |
| WO | 98 25889 | 12/1996 |
| WO | WO 98/01415 | 1/1998 |
| WO | WO 01/38402 | 5/2001 |
| WO | 01 77056 | 10/2001 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

This invention relates to a process for preparing a low-odor hydrogel-forming acrylic acid polymer, which comprises the steps of: a) preparing a polymeric hydrogel by free-radically polymerizing a monomer composition comprising at least 50% by weight of acrylic acid in an aqueous polymerization medium and converting said hydrogel into a particulate hydrogel or into hydrogel-forming powder; and optionally b) treating said particulate hydrogel or said hydrogel-forming powder with a crosslinking substance which, actually or latently, contain at least two functional groups capable of reacting with the carboxyl groups on the addition polymer; characterized by the acrylic acid used in step a) containing less than 400 ppm of acetic acid and propionic acid. It further relates to the hydrogel-forming addition polymers obtainable by the process and to their use.

11 Claims, No Drawings

METHOD FOR PRODUCING LOW-ODOR HYDROGEL-FORMING POLYMERS

BACKGROUND OF THE INVENTION

1. Field of the Invention

The present invention relates to a process for preparing low-odor hydrogel-forming addition polymers which are based on acrylic acid.

2. Description of the Background

Water-absorbing addition polymers, which are also known as hydrogel-forming addition polymers or as superabsorbent polymers (hereinafter abbreviated to SAPs), are capable of absorbing and hence binding aqueous fluids by forming a hydrogel. SAPs therefore find use in hygiene articles such as diapers, incontinence inserts and briefs, sanitary napkins and the like to absorb body fluids. A comprehensive overview of SAPs, their application and their production is given by F. L. Buchholz and A. T. Graham (editors) in Modern Superabsorbent Polymer Technology, Wiley-VCH, New York, 1998.

Among SAPs, those based on acrylic acid constitute a particularly important class of materials. However, their process of preparation is such that they generally contain a large amount of volatiles or elutables, e.g. unconverted monomers (residual monomers) and especially unconverted acrylic acid monomer. Yet, SAPs to be used in hygiene articles or else in food packaging materials or as assistants in the agricultural sector shall in principle have low levels of volatile and elutable materials. A reduction in these levels is also desirable from an ecological viewpoint.

There have been various proposals for reducing the level of volatile residual monomer in acrylic acid based SAP. An overview may be found in EP 372706 for example. Proposals include the irradiation of SAP with ultraviolet light (JP 62260906), the addition of amines (JP-A 5040649) or sulfite or hydrogen sulfite (U.S. Pat. No. 4,306,955), the extraction with hydrophilic organic solvents or with supercritical $CO_2$, the use of specific initiator combinations, such as redox initiators combined with azo initiators, or the use of microorganisms (U.S. Pat. No. 4,742,114).

EP-A 372706 discloses preparing acrylic acid polymers having a low residual monomer content by using an aqueous acrylic acid solution obtained by first admixing an acrylic acid solution with a molar excess of a base and, following a delay time, adding further acrylic acid to set a degree of neutralization in the range from 20 to 100%.

EP-A 574260 discloses a similar procedure, except that the acrylic acid used contains less than 1000 ppm of β-hydroxypropionic acid. The acrylic acid is always freshly distilled for this purpose.

Existing methods are in some instances effective in reducing the measurable residual monomer content of SAPs based on acrylic acid. Yet, these SAPs frequently have an unpleasant odor. True, this unpleasant odor does not in principle diminish their water-absorbing properties, but it leads to a reduced customer acceptance in hygiene article applications in particular.

SUMMARY OF THE INVENTION

It is an object of the present invention to provide a process for preparing low-odor superabsorbents.

We have now found that the occurrence of the unpleasant odor correlates with increased concentrations of acetic acid and/or propionic acid in the acrylic acid used in the polymerization. We believe that the odor is attributable to volatile derivatives of these acids or to thermolysis products of the derivatives. We further believe that these derivatives are formed in the course of the production of the SAP by reaction of these acids with, for example, thermolysis products of the SAP, with polyhydric alcohols as used for postcrosslinking and/or with miscellaneous, hitherto unidentified by-products of SAP production. The odor problem is particularly acute when the SAP is produced by a process including a surface postcrosslinking step in which the hydrogel-forming acrylic acid polymer intermediate is treated with a crosslinking substance which, actually or latently, contain at least two functional groups capable of reacting with the carboxyl groups on the polymer. The odor problem presents in particular whenever the SAP is produced using a partially or completely neutralized acrylic acid.

We have found that the object set forth above is achieved when such SAPs are produced using an acrylic acid whose total acetic acid and propionic acid content is less than 400 ppm.

The present invention accordingly provides a process for preparing a low-odor hydrogel-forming acrylic acid polymer, which comprises the steps of:

a) preparing a polymeric hydrogel by free-radically polymerizing a monomer composition comprising at least 50% by weight of acrylic acid in an aqueous polymerization medium and converting said hydrogel into a particulate hydrogel or into hydrogel-forming powder; and optionally b) treating said particulate hydrogel or said hydrogel-forming powder with a crosslinking substance which, actually or latently, contain at least two functional groups capable of reacting with the carboxyl groups on the addition polymer;

characterized by the acrylic acid used in step a) containing less than 400 ppm, preferably not more than 300 ppm and especially not more than 200 ppm of the total acetic acid and propionic acid content. Here and hereinafter, all ppm units are by weight based on acrylic acid.

DETAILED DESCRIPTION OF THE PREFERRED EMBODIMENTS

Acrylic acid having a total acetic acid and propionic acid content of not more than 400 ppm, preferably not more than 300 ppm and especially not more than 200 ppm can in principle be prepared by crystallizing acrylic acid containing a higher level of these impurities. Suitable processes for crystallizing acrylic acid are known from EP-A 616998, EP-A 648520, EP-A 730893, EP-A 776875, WO 98/25889 and WO 01/77056. The processes described, especially the process described in WO 01/77056, make it possible to transform crude acrylic acid into a glacial acrylic acid which has the maximum concentrations of acetic acid and propionic acid which are to be observed according to the present invention.

A useful acrylic acid for the process of the present invention is obtained by a single or multiple stage crystallization of a crude acrylic acid having a total acetic acid and propionic acid content in the range from 0.05 to 5% by weight and especially in the range from 0.1 to 3% by weight. The crude acrylic acid may in addition contain further organic impurities which are likewise substantially removed in the course of the crystallization. The level of these further organic impurities will generally not be more than 3% by weight. Examples of further impurities are diacrylic acid, aromatic aldehydes such as furfural and benzaldehyde, also allyl acrylate, acrolein, aliphatic aldehydes, maleic acid and maleic anhydride and also process inhibitors such as phenothiazine(dibenzene-1,4-thiazine; PTZ) and 4-hydroxy-2,2,6,6-tetramethylpiperidine-1-oxyl(4-OH-TEMPO) or similar stabilizers which are frequently added to acrylic acid to stabilize it.

Typical crude acrylic acids useful for crystallization contain from 70 to 99.9% by weight and especially from 97.0 to 99.7% by weight of acrylic acid, from 0.05 to 5% by weight and especially from 0.1 to 3% by weight of acetic acid and propionic acid, from 0.005 to 1% by weight and especially from 0.01 to 0.1% by weight of aromatic aldehydes, up to 5% by weight, for example in the range from 0.01 to 3% by weight, of diacrylic acid, from 0.001 to 0.3% by weight and especially from 0.005 to 0.1% by weight of process inhibitor and up to 1% by weight, for example from 0.001 to 1% by weight, of other organic impurities, all the percentages being based on the gross composition of the acrylic acid. The water content of crude acrylic acids is generally not more than 5% by weight and especially not more than 3% by weight. However, it is also possible to use acrylic acid having a higher water content, for example up to 30% by weight.

To carry out the crystallization, the crude acrylic acid is transferred into a crystallizer and a portion of the acrylic acid is crystallized out by cooling. This acrylic acid is separated from the mother liquor and subsequently melted or dissolved in water or aqueous alkali for further processing. It is preferable at this stage to add small amounts of a stabilizer, preferably a hydroquinone or hydroquinone monoalkyl ether such as hydroquinone monomethyl ether, to the acrylic acid. The amount of stabilizer is generally in the range from 10 to 500 ppm and especially in the range from 50 to 300 ppm.

If necessary, the acrylic acid thus obtained can be fed to one or more, for example 2, 3, 4, 5 or 6, further, successive crystallization stages until the desired degree of purity is achieved. If this is done, it is preferably done according to the countercurrent principle, ie the mother liquor or any given crystallization stage is fed to whichever is the preceding crystallization stage. If necessary, further purification steps are carried out before the acrylic acid is isolated.

The mother liquor which is obtained at the crystallization and which contains acrylic acid can likewise be fed to one or more, successive, further crystallization stages to recover further acrylic acid. If this is done, it is preferably done according to the countercurrent principle, ie the crystallizate obtained from the mother liquor of a preceding crystallization stage, for example of the first crystallization stage, is added to the acrylic acid to be crystallized in the preceding crystallization stage, for example to the crude acrylic acid to be crystallized in the first stage.

In an alternative embodiment, the mother liquor obtained in the crystallization (in the case of a multiple stage crystallization, preferably the mother liquor obtained in the 1st stage) is subjected to a simple distillation or to a fractional distillation. In the course of the distillation, the acrylic acid is distilled off over head and the sparingly volatile impurities of the mother liquor such as maleic acid or maleic anhydride and process inhibitors are removed as a bottom product. Processes for this purpose are known from WO 00/01657, which is hereby incorporated herein by reference. Advantageously, the simple distillation takes the form of the mother liquor being sent to a falling film evaporator. The mother liquor can then be fed to a further use or added to the crude acrylic acid to be crystallized.

The crystallization in a given crystallization stage is preferably carried on until at least 20% by weight and preferably at least 40% by weight of the acrylic acid in the crude acrylic acid have crystallized out. The proportion of acrylic acid crystallized out in a given crystallization stage is generally not more than 90% by weight, preferably not more than 80% by weight and especially not more than 70% by weight, to obtain an adequate purifying effect.

The crystallizer used in the process of the present invention is not subject to any restriction. Particularly useful crystallizers work on the basis of the formation of crystals on cooled surfaces. Such crystallization processes are also known as layer crystallization. Suitable apparatus is described in DE-A 17 69 123, DE-A 26 06 364, EP-A 218 545, EP-A 323 377, CH 645278, FR 2668946, EP-A 616998, EP 638520 and U.S. Pat. No. 3,597,164.

For layer crystallization, the crude acrylic acid is brought into contact with the cooled surfaces of a heat exchanger. The heat exchanger surfaces of the crystallizer are preferably cooled to temperatures which are up to 40 K below the melting temperature of the acrylic acid in the crude acrylic acid. Once the desired degree of crystallization is achieved, the cooling operation is terminated and the liquid mother liquor is removed, for example by pumping it away or allowing it to flow away. The purified, crystallized acrylic acid is generally isolated by melting the crystallized acrylic acid, for example by heating the heat exchanger surfaces to a temperature above the melting temperature of acrylic acid and/or by adding a melt of purified acrylic acid. In the process, the purified acrylic acid is obtained as a melt and is isolated as such. Similarly, the crystalline acrylic acid can be dissolved in water or aqueous alkali and the solution thus obtained can with or without addition of a stabilizer be directly used in the polymerization which follows.

An additional purifying step in the case of a layer crystallization can for example take the form of sweating the layer of crystals deposited on the heat exchanger surfaces. In sweating, the temperature of the layer of crystals is raised somewhat, for example by from 0.5 to 5 K, above the melting temperature, and the more contaminated regions of the layer of crystals will melt off preferentially, which provides an additional purifying effect. The sweating step product is then added to the mother liquor and further processed together with it. It is also possible to treat the layer of crystals with a purifying liquid, for example with a melt of purified acrylic acid.

The temperature required for the crude acrylic acid in a layer crystallizer depends on the composition of the crude acrylic acid. The upper limit up to the temperature required is naturally the temperature at which acrylic acid which has already crystallized is in equilibrium with the acrylic acid in the mother liquor (equilibrium temperature). Depending on the composition of the crude product, the equilibrium temperature is in the range from +5 to +13.5° C. The temperature of the acid to be crystallized is preferably in the range from 0 to 13.5° C. and specifically in the range from 5 to 12° C., highly supercooled melts being generally avoided. More particularly, the cooling medium needed to remove heat of crystallization in dynamic layer crystallization is cooled from about +5 to −5° C. to about −10 to −25° C. in the course of the crystallization operation. In a static layer crystallization, the cooling medium is preferably cooled from an initial temperature in the range from +5 to −15° C. to about −15 to −30° C. toward the end of the crystallization.

In an embodiment of the crystallization process, the layer crystallization is carried out in the presence of seed crystals. Preferably, the crystallizer surfaces from which crystals grow in the course of the crystallization are coated with a seed layer of acrylic acid prior to the crystallization. The seed crystals can be obtained not only from the crude acrylic acid to be purified but also from a melt of purified acrylic acid. For example, seed crystals can be generated on crystallizer surfaces where crystal growth is to take place by generating a melt film containing acrylic acid on these surfaces and freezing the film on, for example by cooling to a temperature below the melting temperature. Preferably, the seed crystals are generated by applying a film from a suspension of acrylic acid crystals in an acrylic acid melt and subsequently freezing this film on. The film is preferably frozen on at a temperature in the region of the equilibrium temperature. A suspension of this type can be generated by freezing out a small amount of crystals from the crude product or a melt of the purified acrylic acid by supercooling. Seed crystals are preferably generated in an amount from 0.1 to 200 g/kg of melt and especially in the range from 1 to 100 g/kg of melt.

The crystallization on cooling surfaces can be carried out as a dynamic or static process. Preference is given to using dynamic processes or combinations of static and dynamic processes. Dynamic processes are known from the above-cited references. Static processes are described in U.S. Pat. No. 3,597,164, EP 323377 and FR 2668946, which are all hereby incorporated herein by reference. In the static process, mass transfer in the liquid phase takes place only as a result of free convection (static melt).

In the dynamic crystallization processes, the crude product to be crystallized is maintained in a flowing motion. This can be accomplished by forced flow in fully flooded heat exchangers as described for example in DE 2606364, or by applying a trickling film to a cooled wall, as described in DE-B 1769123 and EP-A 218545, for example, or by means of agitated cooling surfaces such as cooling rolls or cooling belts. The dynamic layer crystallization is preferably carried out in fully flooded heat exchangers, for example in externally cooled tubes or tube bundles.

Dynamic layer crystallization processes, especially dynamic layer crystallization processes carried out in fully flooded heat exchangers, are generally carried out by (optionally after a layer of seed crystals has been applied to the heat exchanger surfaces of the crystallizer) bringing the crude acrylic acid into contact with the cooled heat exchanger surfaces, for example by flowing the crude product through the cooled tubes of the crystallizer. During this operation, the acrylic acid will at least partly crystallize out. This operation is generally discontinued when, owing to the amount of acrylic acid which has crystallized out, sufficient melt flow through the heat exchanger is still just possible. For this purpose, the liquid phase (mother liquor) is removed and then the crystallized acrylic acid is isolated in the manner described above by (where appropriate after a further purification step) heating the heat exchanger surfaces to a temperature above the melting temperature of acrylic acid. This operation can be repeated a number of times until the desired amount of acrylic acid has crystallized out from the crude product.

As an alternative to layer crystallization, the crystallization can also be carried out as a suspension crystallization. In this case, the crude acrylic acid is cooled to generate a suspension of purified acrylic acid crystals in an impurity-rich melt. The acrylic acid crystals can grow directly in the suspension (melt) or become deposited as a layer on a cooled wall from which they are subsequently scraped and suspended in the residual melt. The crystal suspension is preferably agitated during the suspension crystallization process, especially by pumping or stirring. With regard to the melt temperatures required to crystallize the acrylic acid, the above remarks apply.

In a suspension crystallization, the heat is generally removed by indirect cooling, for example via scrape coolers connected to a stirred tank or to a container without stirrer. The circulation of the crystal suspension is ensured here by means of a pump. But it is also possible to remove the heat via walls of the stirred tank using close-clearance stirrers. Also suitable for removing heat is the use of cooling-disk crystallizers as manufactured for example by GMF (Gouda in The Netherlands). It will be appreciated that the heat can also be removed by cooling via conventional heat transfer systems (preferably tube bundle or plate type heat transfer systems). Suitable apparatus for a suspension crystallization is described for example in Chem.-Ing.-Techn. 57 (1985) No.2 p. 91-102.

A suspension crystallization produces a crystallizate which is enriched with acrylic acid and it is separated from the depleted mother liquor by the familiar solid-liquid separation processes, for example by filtration, sedimentation and/or centrifugation. If the crystallizate is stationary, the mother liquor can also be removed by allowing the mother liquor to run off. The crystal suspension can also be transferred directly into a washing column as described in the process of WO 01/77056, especially when the acrylic acid crystallization is carried out in the presence of from 0.2 to 10% by weight, and specifically from 0.6 to 3% by weight of water, based on the acrylic acid in the crude acid.

The solid-liquid separation may be accompanied and/or followed by further process steps for increasing the purity of the crystals or of the crystal cake. Preferably, the removal of the crystals from the mother liquor is followed by a single or multiple stage washing and/or sweating operation on the crystals or on the crystal cake. The wash liquor used is preferably liquid acrylic acid whose purity is above that of the mother liquor. The washing can be carried out in the apparatus customary for this purpose, for example in centrifuges or in suction filters or belt filters.

The wash can be carried out in one or more stages, in which case the wash liquor preferably flows countercurrently to the crystal cake. In a multiple stage crystallization, the wash liquor for the crystallizate of a given crystallization stage is particularly suitably used as the feed to the same crystallization stage. The mass ratio of wash liquor to crystallizate is preferably in the range from 0.1 to 1 and more preferably in the range from 0.2 to 0.6 kg of wash liquor per kg of crystallizate.

The crystallizate obtained in a suspension crystallization is preferably purified using washing columns in which the crystallizate, preferably after a prethickening operation, for example by filtration or sedimentation, is conducted countercurrently to a wash liquor. The crystallizate transferred into the washing column will preferably contain not more than 30% by weight, for example from 5 to 30% by weight, of residual melt, based on the crystallizate. A purification in washing columns can be carried out continuously or batchwise. The wash liquor used is preferably a melt of the already purified crystallizate. The transportation of the crystals counter to the flow direction can be effected in a conventional manner, for example by means of gravitational force, but preferably with forced transportation of the acrylic acid crystals, for example by mechanical conveyance or by hydraulic forces (eg loss of head on flowing through the pile of crystals). Suitable washing columns are described for example in Chem.-Ing.-Techn. 57 (1985) No. 2 p. 91-102, Chem.-Ing.-Techn. 63 (1991) No. 9 p. 881-891, WO 99/06458, and also in EP-A 97405, EP-A 305316, EP-A 191194, EP-A 193226, EP-A 373720, EP-A 398437, EP-A 920894, U.S. Pat. No. 4,735,781, U.S. Pat. No. 4,787,985, WO 00/24491 and WO 01/77056, all of which are hereby incorporated herein by reference. The temperature difference between the acrylic acid melt recycled in the washing column and the crystallizate fed to the washing column will frequently be in the range from 2 to 15° C. and is especially in the range from 2 to 10° C. and specifically in the range from 2 to 4° C. For further details in this regard, see the prior art, especially WO 01/77056.

All the aforementioned crystallization processes can be carried out continuously or batchwise and/or combined with each other. The preferred dynamic layer crystallization process is preferably carried out batchwise, especially when carried out in fully flooded heat exchangers as described above. The crystallization process used for purifying the acrylic acid preferably comprises at least one layer crystallization.

The acrylic acid obtained after purification has according to the invention a total propionic acid and acetic acid content of not more than 400 ppm, especially not more than 300 ppm and more preferably not more than 200 ppm. The level of other non-water impurities such as aromatic aldehydes, process inhibitors and other organic impurities is generally not more than 500 ppm, especially not more than 300 ppm and specifically not more than 200 ppm, the level of aromatic aldehydes generally being not more than 20 ppm and specifically being not more than 10 ppm. Especially the level of process inhibitors other than MEHQ is ≦10 ppm. The level of MEHQ and similar stabilizers is generally in the range from 10 to 300 ppm and especially in the range from 50 to 250 ppm.

Typical crude acrylic acids useful as a feedstock for the crystallization process contain from 80 to 99.8% by weight and especially from 98.0 to 99.7% by weight of acrylic acid, at least 500 ppm and frequently 1000 ppm up to 5% by weight, especially from 1000 ppm to 1% by weight, of aliphatic carboxylic acids, specifically acetic acid and/or propionic acid. The level of aromatic aldehydes is generally in the range from 0.005 to 1% by weight and especially in the range from 0.01 to 0.1% by weight, for example from 0.005 to 0.8% by weight of furfural and from 0.001 to 0.6% by weight of benzaldehyde. The level of process inhibitor, for example PTZ and/or 4-OH-TEMPO, is generally in the range from 0.005 to 0.3% by weight and especially in the range from 0.02 to 0.1% by weight, each percentage being based on the gross composition of the crude acrylic acid. In addition, the acrylic acid to be purified may contain further organic impurities which have an adverse effect on the polymerization of acrylic acid, examples being diacrylic acid or allyl acrylate. The proportion of these further impurities will generally not exceed 5% by weight, based on the gross composition of the crude acrylic acid, and is for example in the range from 0.001 to 3% by weight. The diacrylic acid fraction depends naturally on the age, ie the storage time, of the acrylic acid and can be to to 5% by weight and frequently up to 3% by weight. The diacrylic acid fraction is frequently in the range from 0.02 to 2% by weight. The water content of crude acrylic acid is generally not more than 5% by weight and especially not more than 3% by weight. However, it is also possible to use acrylic acid having a higher water content, for example up to 20% by weight.

Suitable crude acrylic acids are known and are obtainable on a large industrial scale by catalytic oxidation of C3 hydrocarbons, especially by oxidation of propane, propene and mixtures thereof, the crude acrylic acid being recovered in a known manner, for example by fractional condensation, total condensation, by absorption in a suitable absorbent, for example in high-boiling organic solvents or in water, followed by a separation of the acrylic acid and of the absorbent, from the reaction gas (with regard to the recovery of crude acrylic acid via absorption in a high-boiling organic absorbent, for example by absorption in a mixture of diphenyl ether and biphenyl see DE-A 21 36 396, DE-A 43 08 087 and Ullmann's Encyclopedia of Ind. Chem. 5$^{th}$ ed. on CD-ROM, loc. cit.; for the recovery of crude acrylic acid via absorption in water see for example EP-A 511 111 and references cited therein; for recovery of crude acrylic acid by total condensation of the reaction gas and subsequent distillation with azeotropic entrainers see for example DE-A 34 29 391 and JP-A 1124766; for recovery of crude acrylic acid by extraction processes with organic solvents see for example DE-A 21 64 767, JP-A 58140039, U.S. Pat. No. 3,553,261, U.S. Pat. No. 4,219,389, GB 1,427,223, U.S. Pat. No. 3,962,074 and DE 23 23 328; for recovery of crude acrylic acid by fractional condensation see for example DE-A 197 40 253 and prior German patent application 10053086.9). Preferred crude acrylic acids are obtained by the processes of EP-A 511 111 and of prior German patent application 10053086.9.

The acrylic acid based SAP is prepared in a conventional manner, initially by free-radically polymerizing a monomer composition comprising at least 50% by weight of acrylic acid in an aqueous polymerization medium to prepare a hydrogel. Aqueous polymerization medium here refers not only to aqueous solutions but also to water-in-oil emulsions.

Useful polymerization processes include in particular the solution polymerization process, ie a polymerization in a homogeneous aqueous phase, and the suspension polymerization process. An overview of polymerization processes used for producing hydrogels on the basis of acrylic acid is given by F. L. Buchholz and A. T. Graham (editors) in Modern Superabsorbent Polymer Technology, p. 69 to 117 and references cited therein.

In a preferred embodiment of the process, the polymerization is carried out as a solution polymerization by utilizing the Trommsdorff-Norrish effect (gel polymerization). For this purpose, an aqueous, generally 10 to 70% by weight and preferably 20 to 60% by weight aqueous solution, of an acrylic acid containing monomer mixture is polymerized in the presence of a free-radical former in the presence or absence of a suitable grafting base.

The acrylic acid containing monomer mixture is preferably used in the process of the invention in partially or completely neutralized form, ie the degree of neutralization of all acid-functional monomers is in the range from 20 to 100%, and preferably in the range from 50 to 100%. Particular preference is given to using the monomer mixture in an aqueous solution having a degree of neutralization in the range from 60 to 100%.

Useful neutralizing agents include alkali metal bases, ammonia and/or amines. Preference is given to using alkali metal bases such as aqueous sodium hydroxide solution, aqueous potassium hydroxide solution, sodium carbonate, sodium bicarbonate, potassium carbonate or potassium bicarbonate or other carbonates or bicarbonates.

The polymerization is preferably conducted in the substantial or complete absence of oxygen, since oxygen itself and, in the presence of oxygen, the stabilizers customarily present in acrylic acid upset the polymerization reaction. It is therefore preferable to conduct the polymerization under an inert gas atmosphere. Especially nitrogen is used as an inert gas. More particularly, it is useful for the aqueous monomer solution to be polymerized or the monomer-containing aqueous polymerization medium to be flushed with inert gas before and/or during the polymerization in step a).

The temperature at which the polymerization is carried out is generally in the range from 0° C. to 150° C. and preferably in the range from 10° C. to 100° C., and the polymerization can be carried out not only at atmospheric pressure but also under elevated or reduced pressure. As usual, the polymerization can also be carried out in a protective gas atmosphere, preferably under nitrogen.

Based on its total weight, the monomer mixture to be polymerized generally contains:

from 50 to 99.99% by weight, preferably from 70 to 99.9% by weight and especially from 80 to 99.8% by weight of acrylic acid as monomer A, from 0 to 49.99% by weight, especially from 0 to 29.9% by weight and especially from 0 to 19.8% by weight of one or more monoethylenically unsaturated monomers B which are copolymerizable with acrylic acid, and from 0.01 to 20% by weight, especially from 0.1 to 15% by weight and especially from 0.2 to 3% by weight of at least one crosslinking compound C.

Here and hereinbelow, all weight fractions are based on the total weight of all the monomers to be polymerized, and weight indications relating to acid-functional monomers which can also be present as salts are always based on the acid form.

Examples of useful monomers B include acid-functional monomers B1 other than acrylic acid, for example monoethylenically unsaturated mono- and dicarboxylic acids having preferably from 4 to 8 carbon atoms such as methacrylic acid, ethacrylic acid, α-chloroacrylic acid, crotonic acid, maleic acid, maleic anhydride, itaconic acid, citraconic acid, mesaconic acid, glutaconic acid, aconitic acid and fumaric acid; monoesters of monoethylenically unsaturated dicarboxylic acids having from 4 to 10 and preferably from 4 to 6 carbon atoms, for example monoesters of maleic acid such as monomethyl maleate; monoethylenically unsaturated sulfonic acids and phosphonic acids, for example vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acid, 2-acrylamido-2-methylpropanesulfonic acid, vinylphosphonic acid and allylphosphonic acid and the salts, especially the sodium, potassium and ammonium salts, of these acids.

Preferred monomers B1 are methacrylic acid, vinylsulfonic acid, 2-acrylamido-2-methylpropanesulfonic acid or mixtures thereof. The fraction of the total monomer quantity which is accounted for by the monomers B1 is, if desired, preferably in the range from 0.1 to 29.9% and especially from 0.5 to 19.8% by weight, based on the total amount of monomer.

To optimize properties of the polymers according to the present invention, it can be sensible to use monoethylenically unsaturated monomers B2 which bear no acid groups, but are copolymerizable with acrylic acid and, if used, the monomers B1 and are noncrosslinking. Such compounds include for example monoethylenically unsaturated nitriles such as acrylonitrile, methacrylonitrile, the amides of the aforementioned monoethylenically unsaturated carboxylic acids, eg acrylamide, methacrylamide, N-vinylamides such as N-vinylformamide, N-vinylacetamide, N-methylvinylacetamide, N-vinylpyrrolidone and N-vinylcaprolactam. The monomers B2 also include vinyl esters of saturated $C_1$-$C_4$-carboxylic acids such as vinyl formate, vinyl acetate and vinyl propionate, alkyl vinyl ethers having at least 2 carbon atoms in the alkyl group, eg ethyl vinyl ether or butyl vinyl ether, esters of monoethylenically unsaturated $C_3$-$C_6$-carboxylic acids, for example esters of monohydric $C_1$-$C_{18}$-alcohols and acrylic acid, methacrylic acid or maleic acid, acrylate and methacrylate esters of alkoxylated monohydric saturated alcohols, for example alcohols having from 10 to 25 carbon atoms which have been reacted with from 2 to 200 mol of ethylene oxide and/or propylene oxide per mole of alcohol, and also monoacrylates and monomethacrylates of polyethylene glycol or polypropylene glycol, the molar masses ($M_n$) of the polyalkylene glycols being up to 2000, for example. Useful monomers B2 further include styrene and alkyl-substituted styrenes such as ethylstyrene or tert-butylstyrene. The fraction of total monomers which is attributable to the monomers B2 will preferably not exceed 20% by weight and, if desired, preferably ranges from 0.1 to 20% by weight.

Useful crosslinking compounds C include compounds having at least two, for example 2, 3, 4 or 5, ethylenically unsaturated double bonds in the molecule. These compounds are also referred to as crosslinker monomers C1. Examples of compounds C1 are N,N'-methylenebisacrylamide, polyethylene glycol diacrylates and polyethylene glycol dimethacrylates, each derived from polyethylene glycols having a molecular weight from 106 to 8500 and preferably from 400 to 2000, trimethylolpropane triacrylate, trimethylol propane trimethacrylate, ethylene glycol diacrylate, ethylene glycol dimethacrylate, propylene glycol diacrylate, propylene glycol dimethacrylate, butanediol diacrylate, butanediol dimethacrylate, hexanediol diacrylate, hexanediol dimethacrylate, diethylene glycol diacrylate, diethylene glycol dimethacrylate, triethylene glycol diacrylate, triethylene glycol dimethacrylate, dipropylene glycol diacrylate, dipropylene glycol dimethacrylate, tripropylene glycol diacrylate, tripropylene glycol dimethacrylate, allyl methacrylate, diacrylates and dimethacrylates of block copolymers of ethylene oxide and propylene oxide, di-, tri-, tetra- or pentaacrylated or -methacrylated polyhydric alcohols, such as glycerol, trimethylolpropane, pentaerythritol or dipentaerythritol, esters of monoethylenically unsaturated carboxylic acids with ethylenically unsaturated alcohols such as allyl alcohol, cyclohexenol and dicyclopentenyl alcohol, eg allyl acrylate and allyl methacrylate, also triallylamine, dialkyldiallylammonium halides such as dimethyldiallylammonium chloride and diethyldiallylammonium chloride, tetraallylethylenediamine, divinylbenzene, diallyl phthalate, polyethylene glycol divinyl ethers of polyethylene glycols having a molecular weight from 106 to 4000, trimethylolpropane diallyl ether, butanediol divinyl ether, pentaerythritol triallyl ether, reaction products of 1 mol of ethylene glycol diglycidyl ether or polyethylene glycol diglycidyl ether with 2 mol of pentaerythritol triallyl ether or allyl alcohol, and divinylethyleneurea. The fraction of the monomer mixture to be polymerized that is attributable to the monomers C1 is preferably in the range from 0.01 to 5% by weight and especially in the range from 0.2 to 3% by weight.

Useful crosslinking compounds C further include polyfunctional compounds C2 which have at least two, eg 2, 3, 4 or 5, functional groups which is complementary in terms of its reactivity to the carboxyl group on the polymer. Useful crosslinkers C further include crosslinking monomers C3 which, as well as having an ethylenically unsaturated double bond have at least one further functional group that is complementary with regard to carboxyl groups. Also suitable are polymers having a multiplicity of such functional groups. Useful functional groups include for example hydroxyl, amino, epoxy and aziridine groups, further isocyanate, ester and amido groups and also alkyloxysilyl groups. Useful crosslinkers of this type include for example amino alcohols, such as ethanolamine or triethanolamine, di- and polyols, such as 1,3-butanediol, 1,4-butanediol, ethylene glycol, diethylene glycol, triethylene glycol, tetraethylene glycol, polyethylene glycol, glycerol, polyglycerol, propylene glycol, polypropylene glycol, trimethylolpropane, pentaerythritol, polyvinyl alcohol, sorbitol, starch, block copolymers of ethylene oxide and propylene oxide, polyamines such as ethylenediamine, diethylenetriamine, triethylenetetramine, tetraethylenepentamine, pentaethylenehexamine and polyethyleneimines and also polyamines each having molar masses of up to 4 000 000, esters such as sorbitan fatty acid esters, ethoxylated sorbitan fatty acid esters, polyglycidyl ethers such as ethylene glycol diglycidyl ether, polyethylene glycol diglycidyl ether, glycerol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether and polypropylene glycol diglycidyl ether, polyaziridine compounds such as 2,2-bishydroxymethylbutanol tris[3-(1-aziridinyl)propionate], diamides of carbonic acid, such as 1,6-hexamethylenediethyleneurea, diphenylmethanebis-4,4'-N,N'-diethyleneurea, haloepoxy compounds, such as epichlorohydrin and α-methylepifluorohydrin, polyisocyanates, such as 2,4-toluylene diisocyanate and hexamethylene diisocyanate, alkylene carbonates such as 1,3-dioxolan-2-one and 4-methyl-1,3-dioxolan-2-one, further bisoxazolines and oxazolidones, polyamidoamines and also their reaction products with epichlorohydrin, also polyquaternary amines, such as condensation products of dimethylamine with epichlorohydrin, homo- and copolymers of diallyldimethylammonium chloride and also homo- and copolymers of dimethylaminoethyl (meth)acrylate, which have optionally been quaternized with, for example, methyl chloride. Examples of compounds C3 include hydroxyalkyl acrylates and methacrylates and also glycidyl esters of the aforementioned ethylenically unsaturated carboxylic acids and ethylenically unsaturated glycidyl ethers.

The monomers C preferably comprise at least one monomer C1 in the abovementioned amounts. The polymerization is preferably carried out in the absence of compounds C2.

Suitable grafting bases can be of natural or synthetic origin. They include starches, ie native starches from the group consisting of corn (maize) starch, potato starch, wheat starch, rice starch, tapioca starch, sorghum starch, manioca starch, pea starch or mixtures thereof, modified starches, starch degradation products, for example oxidatively, enzymatically or hydrolytically degraded starches, dextrins, for example roast dextrins, and also lower oligo- and polysaccharides, for example cyclodextrins having from 4 to 8 ring members. Useful oligo- and polysaccharides further include cellulose and also starch and cellulose derivatives. It is also possible to use polyvinyl alcohols, homo- and copolymers of N-vinylpyrrolidone, polyamines, polyamides, hydrophilic polyesters or polyalkylene oxides, especially polyethylene oxide and polypropylene oxide. Useful polyalkylene oxides have the general formula I

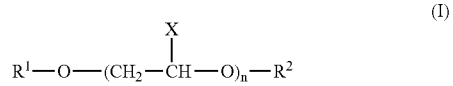

(I)

where $R^1$ and $R^2$ are independently hydrogen; $C_1$-$C_4$-alkyl; $C_2$-$C_6$-alkenyl; aryl, especially phenyl; or (meth)acryoyl; X is hydrogen or methyl; and n is an integer from 1 to 1000 and especially from 10 to 400.

Useful polymerization reactors include the customary production reactors, especially belt reactors, extruders and kneaders in the case of solution polymerization see Modern Superabsorbent Polymer Technology, chapter 3.2.3). The polymers are particularly preferably produced by a continuous or batch kneading process.

Useful initiators include in principle all compounds which decompose into free radicals on heating to the polymerization temperature. The polymerization may also be initiated by the action of high energy radiation, for example UV radiation, in the presence of photoinitiators. Initiation of the polymerization by the action of electron beams on the polymerizable aqueous mixture is also possible.

Useful initiators include for example peroxo compounds such as organic peroxides, organic hydroperoxides, hydrogen peroxide, persulfates, perborates, azo compounds and redox catalysts. Water-soluble initiators are preferred. In some cases it is advantageous to use mixtures of various polymerization initiators, for example mixtures of hydrogen peroxide and sodium peroxodisulfate or potassium peroxodisulfate. Useful organic peroxides include for example acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, di(2-ethylhexyl) peroxydicarbonate, dicyclohexyl peroxydicarbonate, di(4-tert-butylcyclohexyl) peroxydicarbonate, dimyristyl peroxydicarbonate, diacetyl peroxydicarbonate, allyl peresters, cumene peroxyneodecanoate, tert-butyl per-3,5,5-trimethylhexanoate, acetyl cyclohexylsulfonyl peroxide, dilauryl peroxide, dibenzoyl peroxide and tert-amyl perneodecanoate. Particularly useful polymerization initiators include water-soluble azo initiators, eg 2,2'-azobis(2-amidinopropane) dihydrochloride, 2,2'-azobis-(N,N'-dimethylene)isobutyramidine dihydrochloride, 2-(carbamoylazo)isobutyronitrile, 2,2'-azobis[2-(2'-imidazolin-2-yl)propane]dihydrochloride and 4,4'-azobis-(4-cyanovaleric acid). The polymerization initiators mentioned are used in customary amounts, for example amounts from 0.01 to 5%, and preferably from 0.05 to 2.0% by weight based on the monomers to be polymerized.

Redox initiators, which are preferred, are water-soluble initiators and contain as the oxidizing component at least one of the above-specified peroxo compounds and as the reducing component for example ascorbic acid, glucose, sorbose, ammonium or alkali metal sulfite, bisulfite, thiosulfate, hyposulfite, pyrosulfite or sulfide, metal salts, such as iron (II) ions or sodium hydroxymethylsulfoxylate. Preference is given to using ascorbic acid or sodium sulfite as the reducing component of the redox catalyst. Based on the amount of monomers used in the polymerization, from $3 \times 10^{-6}$ to 1 mol % of the reducing component of the redox catalyst system and from 0.001 to 5.0 mol % of the oxidizing component of the redox catalyst is used, for example.

When the polymerization is initiated using high energy radiation, the initiator used is customarily a photoinitiator.

The preparing of the hydrogel in step a) of the process according to the present invention can also comprise a subsequent crosslinking of the gel. In subsequent crosslinking or gel crosslinking, polymers prepared by polymerization of acrylic acid with or without monoethylenically unsaturated comonomers B are reacted with compounds C2 having at least two groups which are reactive toward carboxyl groups. This reaction can take place at room temperature or else at elevated temperatures of up to 220° C. To effect postcrosslinking (gel crosslinking), the crosslinkers C2 are added to the resultant polymers in amounts from 0.5 to 20% by weight and preferably from 1 to 14% by weight, based on the amount of the polymer.

The polymers obtained in step a) are generally obtained as hydrogels. Their moisture content is generally in the range from 20 to 80% by weight. The hydrogel thus obtained is then converted in a conventional manner into a particulate hydrogel or into a hydrogel-forming powder.

For this, the hydrogel obtained in the polymerization is generally initially comminuted by known methods. Coarse comminutation of the hydrogels is effected by means of customary tearing and/or cutting tools, for example by the action of a discharge pump in the case of a polymerization in a cylindrical reactor or by a cutting roll or cutting roll combination in the case of a belt polymerization.

When the monomer mixture was used in unneutralized form, the acidic polymer obtained can be brought to the desired degree of neutralization of generally at least 25 mol %, preferably at least 50 mol % and especially 90-100 mol %, based on acid-functional monomer units. Alternatively, the degree of neutralization may also be set during the polymerization, for example in a kneader.

The thus obtained, preferably completely or partially neutralized addition polymer is subsequently dried at elevated temperature, for example in the range from 80° C. to 250° C. and especially in the range from 100° C. to 180° C., by known processes (see Modern Superabsorbent Polymer Technology chapter 3.2.5). This provides the addition polymers in the form of powders or granules which, if appropriate, are additionally subjected to multiple grinding and classifying operations to set the particle size (see Modern Superabsorbent Polymer Technology chapters 3.2.6 and 3.2.7).

The process of the present invention preferably comprises a surface postcrosslinking step. Surface postcrosslinking is effected in a conventional manner using dried, preferably ground and classified polymer particles or using hydrogels. Surface crosslinking utilizes compounds which have at least two functional groups which are capable of reacting with the functional groups, preferably the carboxyl groups, on the polymers obtained under step a), by crosslinking, and are consequently known as postcrosslinking agents. The functional groups can be present in the postcrosslinking agent in latent form, ie they are only released under the reaction conditions of the surface postcrosslinking step. Useful functional groups in postcrosslinking agents include hydroxyl groups, glycidyl groups, alkoxysilyl groups, aziridine groups, primary and secondary amino groups, N-methylol groups (=N-hydroxymethyl groups, N—CH$_2$—OH groups), oxazolidine groups, urea and thiourea groups, reversibly or irreversibly blocked isocyanate groups and also cyclic carbonate groups as in ethylene carbonate. To effect surface postcrosslinking, the postcrosslinking agents are preferably applied in the form of an aqueous solution to the surface of the addition polymer particles. The aqueous solution can contain water-miscible organic solvents. Useful solvents include for example $C_1$-$C_4$-alcohols such as methanol, ethanol, isopropanol or ketones such as acetone and methyl ethyl ketone.

Useful postcrosslinking agents include for example:
di- or polyglycidyl compounds such as diglycidyl phosphonate or ethylene glycol diglycidyl ether, bischlorohydrin ethers of polyalkylene glycols,
alkoxysilyl compounds,
polyaziridines, aziridine compounds based on polyethers or substituted hydrocarbons, for example bis-N-aziridinomethane,
polyamines or polyamidoamines and also their reaction products with epichlorohydrin,
diols and polyols, for example ethylene glycol, 1,2-propanediol, 1,4-butanediol, glycerol, methyltriglycol, trimethylolethane, trimethylolpropane, polyethylene glycols having an average molecular weight $M_w$ of 200-10 000, di- and polyglycerol, pentaerythritol, sorbitol, the ethoxylates of these polyols and also their esters with carboxylic acids or with carbonic acid such as ethylene carbonate or propylene carbonate,
carbonic acid derivatives such as urea, thiourea, guanidine, dicyandiamide, 2-oxazolidinone and its derivatives, bisoxazoline, polyoxazolines, di- and polyisocyanates,
di- and poly-N-methylol compounds such as for example methylenebis(N-methylolmethacrylamide) or melamine-formaldehyde resins,
compounds having two or more blocked isocyanate groups such as for example trimethylhexamethylene diisocyanate blocked with 2,2,3,6-tetramethylpiperidin-4-one.

A particular embodiment of the process according to the invention utilizes postcrosslinking agents which form ester groups with the carboxyl groups on the addition polymer. Examples thereof are the aforementioned diols and polyols, their esters with carboxylic acids or with carbonic acid and also di- and polyglycidyl compounds and mixtures thereof.

If necessary, acidic catalysts may be added, for example p-toluenesulfonic acid, phosphoric acid, boric acid or ammonium dihydrogenphosphate.

The crosslinker solution is preferably applied by spraying with a solution of crosslinker in conventional reaction mixers or mixing and drying equipment such as for example Patterson-Kelly mixers, DRAIS turbulence mixers, Lödige mixers, screw mixers, plate mixers, fluidized bed mixers and Schugi-Mix. The spraying of the crosslinker solution may be followed by a heat treatment step, preferably in a downstream dryer, at from 80 to 230° C., preferably at from 80 to 190° C. and more preferably at from 100 to 160° C., for a period of from 5 minutes to 6 hours, preferably from 10 minutes to 2 hours and more preferably from 10 minutes to 1 hour, during which not only cleavage products but also solvent fractions can be removed. But the drying may also take place in the mixer itself, by heating the jacket or by blowing in a preheated carrier gas.

The acrylic acid based SAPs obtained by the process according to the present invention are particularly odor neutral, ie, unlike prior art SAPs, they now give off only very slight odor, if any odor at all. They are therefore particularly useful for producing hygiene articles.

The present invention thus also provides the SAPs obtainable by this process and are used for producing hygiene articles such as diapers, incontinence pads and briefs, tampons or sanitary napkins. The present invention further provides hygiene articles comprising an absorbent core which includes at least one water absorbent according to the invention.

The construction and form of hygiene articles, especially diapers, napkins and incontinence pads and briefs for adults, is common knowledge and described for example in EP-A-0

316 518, EP-A-0 202 127, DE 19737434, WO 00/65084, especially p. 6-15, WO 00/65348, especially p. 4-17 and WO 00/35502, especially p. 3-9.

Typical hygiene articles in the form of diapers, napkins and incontinence pads and briefs comprise:
(A) a fluid-pervious topsheet
(B) a fluid-impervious backsheet
(C) a core positioned between (A) and (B) and comprising
  (C1) 10-100% by weight of the SAP according to the present invention
  (C2) 0-90% by weight of hydrophilic fiber material
(D) optionally a tissue layer positioned directly above and below said core (C) and
(E) optionally an acquisition layer positioned between (A) and (C).

The fluid-pervious topsheet (A) is the layer which is in direct contact with the skin. Its material comprises customary synthetic or cellulosic fibers or films of polyesters, polyolefins, rayon or natural fibers such as cotton. In the case of non-woven materials the fibers are generally joined together by binders such as polyacrylates. Preferred materials are polyesters, rayon and blends thereof, polyethylene and polypropylene.

The fluid-impervious layer (B) is generally a sheet of polyethylene or polypropylene.

The core (C) includes not only the hydrogel-forming graft polymer (C1) of the invention but also hydrophilic fiber material (C2). By hydrophilic is meant that aqueous fluids are rapidly distributed across the fiber. The fiber material is usually cellulose, modified cellulose, rayon, polyester such as polyethylene terephthalate. Particular preference is given to cellulosic fibers such as pulp. The fibers generally are from 1 to 200 µm and preferably from 10 to 100 µm in diameter. They also have a minimum length of 2 mm.

The fraction of hydrophilic fiber material based on the total amount of the core is preferably from 20 to 80% by weight and more preferably from 40 to 70% by weight.

The superabsorbents prepared by the process according to the invention and the hygiene articles produced using the superabsorbents are surprisingly notable for a particularly low self-odor. They therefore likewise form part of the subject matter of the present invention.

The nonlimiting examples which follow illustrate the invention.

The glacial acrylic acid used in all cases was obtained from a crude acrylic acid product of the process of DE-A 4308087 by crystallization or distillation, in all cases the level of diacrylic acid being <500 ppm, the level of aromatic aldehydes <5 ppm and the level of process inhibitors <5 ppm.

EXAMPLE 1

Superabsorbent I 1735 g of a glacial acrylic acid A containing 160 ppm of acetic acid and 30 ppm of propionic acid and prepared by crystallization of crude acrylic acid, 1445 g of 50% by weight aqueous sodium hydroxide solution and 2760 g of water were used to prepare a partially neutralized acrylic acid/sodium acrylate solution which was deoxygenated in a conventional manner by treatment with countercurrent nitrogen in a stripping column. The substantially oxygen-free solution was transferred into a Werner & Pfleiderer LUK 8 trough kneader with jacket heating and admixed with 7.8 g of polyethylene glycol diacrylate by thorough mixing. The reactor was blanketed with nitrogen throughout the entire reaction time. While the stirrer shafts were in motion, 33.12 g of sodium peroxodisulfate were added as a 15% by weight aqueous solution, followed by 20.79 g of ascorbic acid as a 0.5% by weight solution. On completion of the addition, the contents of the kneader were heated at a heating fluid temperature of 74° C. The contents began to heat up spontaneously and became increasingly viscid. As soon as the maximum temperature of the kneader contents was exceeded, the heating was switched off and the contents were left to undergo supplementary polymerization for 15 min. The contents of the kneader were cooled to 50-60° C. and discharged onto a drying sieve in a thin layer and dried at 160° C. for 90 min. The dried addition polymer was subsequently comminuted to a final particle size of 100-850 µm by grinding and sieving.

1.8 kg of the powder thus produced were introduced into a 5 l capacity Lödige plowshare mixer. A solution of 1.4 g of ethylene glycol diglycidyl ether in 59 g of water and 29 g of 1,2-propanediol was sprayed onto the powder in the course of from 5 to 10 min. The product was heated to 120° C. and held at that temperature for 60 min in order that the solvent may distill off. This was followed by cooling and sieving to the particle size fraction 100-850 µm.

EXAMPLE 2

Superabsorbent II

Example 1 was repeated to prepare a superabsorbent II by replacing glacial acrylic acid A with a crystallization-produced glacial acrylic acid B containing 240 ppm of acetic acid and 60 ppm of propionic acid.

EXAMPLE 3

Superabsorbent III

Example 1 was repeated to prepare a superabsorbent III by replacing glacial acrylic acid A with a distillation-produced glacial acrylic acid C containing 1200 ppm of acetic acid and 300 ppm of propionic acid, the level of diacrylic acid being <500 ppm, the level of aromatic aldehyde <5 ppm and the level of process inhibitors <5 ppm.

The thus prepared superabsorbents I to III were subsequently subjected to a whiff test. For this, five 15 g samples of each superabsorbent were heat-treated in gastightly sealed sample vessels for 5 h at 30° C. Afterward, 5 judges rated the odor of the sample on a scale from 1 to 5, where 1 denotes no or a barely perceptible self-odor, 2 a slight self-odor, 3 a distinct self-odor, 4 a strong self-odor and 5 a very strong self-odor. The results are summarized in Table 1.

TABLE 1

| Super-absorbent | Σ acid[1] [ppm] | Assessment by judge # | | | | |
|---|---|---|---|---|---|---|
| | | 1 | 2 | 3 | 4 | 5 |
| I | 180 | 2 | 1 | 1 | 1 | 1 |
| II | 300 | 2 | 1 | 2 | 1 | 1 |
| III | 1500 | 5 | 3 | 4 | 3 | 4 |

[1]total concentration of acetic acid and propionic acid, based on acrylic acid

As Table 1 reveals, superabsorbents prepared according to the present invention have a barely perceptible self-odor, if any, whereas superabsorbents which do not accord with the present invention have a strong or very strong self-odor. In addition, superabsorbent III was rated by all judges as giving off an unpleasant smell.

We claim:

1. A process for preparing a low-odor hydrogel-forming acrylic acid polymer, which comprises the steps of:
   a) preparing a polymeric hydrogel by free-radically polymerizing a monomer composition comprising at least 50% by weight of acrylic acid containing volatile saturated carboxylic acids selected from the group consisting of acetic acid, propionic acid and combinations thereof as impurities in a total amount of less than 400 ppm, by weight, based on the amount of acrylic acid, in an aqueous polymerization medium and converting said hydrogel into a particulate hydrogel or into hydrogel-forming powder; and
   b) treating said particulate hydrogel or said hydrogel-forming powder with a crosslinking substance which, actually or latently, contains at least two functional groups capable of reacting with the carboxyl groups on the addition polymer.

2. The process as claimed in claim 1, wherein the acrylic acid polymerized in step a) is an acrylic acid obtained by a single or multiple stage crystallization of a crude acrylic acid having an acetic and/or propionic acid content in the range from 0.1 to 5% by weight.

3. The process as claimed in claim 2, wherein the acrylic acid monomer of step a) is obtained by single or multiple stage crystallization of said crude acrylic acid at a temperature ranging from 0 to 13° C.

4. The process as claimed in claim 1, wherein the acrylic acid monomer of step a) is in the form of a partially or completely neutralized aqueous acrylic acid solution.

5. The process as claimed in claim 1, wherein the crosslinker in step b) is selected from compounds capable of forming ester groups with the carboxyl groups on the addition polymer.

6. The process as claimed in claim 1, wherein the monomer mixture to be polymerized in step a) comprises, based on its total weight, from 50 to 99.99% by weight of acrylic acid as monomer A, from 0 to 49.99% by weight of one or more monoethylenically unsaturated monomers B which are copolymerizable with acrylic acid, and from 0.01 to 30% by weight of at least one crosslinking compound C.

7. The process as claimed in claim 1, wherein the acrylic acid monomer contains not more than 300 ppm of acetic acid, propionic acid or combinations thereof.

8. The process as claimed in claim 1, wherein the acrylic acid monomer contains not more than 200 ppm of acetic acid, propionic acid or combinations thereof.

9. A hydrogel-forming addition polymer obtainable by a process as claimed in claim 1.

10. A method for preparing a hygiene article comprising:
    forming the hydrogel-forming addition polymer as claimed in claim 9 into a shape of said hygiene article.

11. Hygiene articles comprising an absorbent core which contains at least one hydrogel-forming addition polymer as claimed in claim 9.

* * * * *